US006983797B2

(12) United States Patent
Nguyen et al.

(10) Patent No.: US 6,983,797 B2
(45) Date of Patent: Jan. 10, 2006

(54) LIGHTWEIGHT HIGH STRENGTH PARTICLES AND METHODS OF THEIR USE IN WELLS

(75) Inventors: Philip D. Nguyen, Duncan, OK (US); David L. Lord, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 247 days.

(21) Appl. No.: 10/443,532

(22) Filed: May 22, 2003

(65) Prior Publication Data

US 2004/0231844 A1   Nov. 25, 2004

(51) Int. Cl.
*E21B 43/04* (2006.01)
(52) U.S. Cl. ............... 166/278; 166/280.2; 507/906; 507/924
(58) Field of Classification Search ........... 166/278, 166/280.2, 308.1; 507/924, 906, 269
See application file for complete search history.

(56) References Cited

U.S. PATENT DOCUMENTS

| | | | | |
|---|---|---|---|---|
| 4,440,866 A | | 4/1984 | Lunghofer et al. ......... 501/127 |
| 4,493,875 A | * | 1/1985 | Beck et al. .............. 166/280.2 |
| 4,879,181 A | | 11/1989 | Fitzgibbon ................. 428/402 |
| 4,921,820 A | | 5/1990 | Rumpf et al. .............. 501/128 |
| 4,921,821 A | | 5/1990 | Rumpf et al. .............. 501/128 |
| 4,997,116 A | | 3/1991 | Grim ...................... 224/42.03 |
| 5,030,603 A | | 7/1991 | Rumpf et al. .............. 501/127 |
| 5,120,455 A | | 6/1992 | Lunghofer ............... 252/8.551 |
| 5,188,175 A | * | 2/1993 | Sweet .................... 166/280.2 |
| 5,225,123 A | * | 7/1993 | Torobin .................. 166/280.1 |
| RE34,371 E | | 9/1993 | Rumpf et al. .............. 501/128 |
| 5,443,603 A | | 8/1995 | Kirkendall ................. 51/296 |
| 6,330,916 B1 | * | 12/2001 | Rickards et al. .......... 166/280.2 |
| 6,372,678 B1 | | 4/2002 | Youngman et al. ......... 501/128 |
| 6,406,789 B1 | | 6/2002 | McDaniel et al. .......... 428/402 |
| 2002/0048676 A1 | | 4/2002 | McDaniel et al. .......... 428/404 |
| 2002/0058581 A1 | | 5/2002 | Youngman et al. ......... 501/155 |

FOREIGN PATENT DOCUMENTS

| | | |
|---|---|---|
| EP | 0 101 855 A1 | 3/1984 |
| WO | WO 03/027431 A2 | 4/2003 |

OTHER PUBLICATIONS

Foreign communication from a related counterpart application dated Aug. 30, 2004.

* cited by examiner

*Primary Examiner*—John Kreck
(74) *Attorney, Agent, or Firm*—Robert A. Kent

(57) ABSTRACT

Light weight high strength particles and methods of treating subterranean producing zones utilizing the particles are provided. The light weight high strength particles of the invention are basically comprised of sintered mixtures of a base material and hollow microspheres.

15 Claims, No Drawings

LIGHTWEIGHT HIGH STRENGTH PARTICLES AND METHODS OF THEIR USE IN WELLS

BACKGROUND OF THE INVENTION

1. Field of the Invention

The present invention relates to light weight high strength particles and methods of treating subterranean producing zones with fluids containing the particles.

2. Description of the Prior Art

Treating fluids containing high strength particles are used in a variety of operations and treatments conducted in oil and gas wells. Such operations and treatments include, but are not limited to, well completion operations and production stimulation treatments.

An example of a well completion operation using a treating fluid containing particles is gravel packing. In gravel packing operations, particles referred to in the art as gravel are carried to a subterranean producing zone in which a gravel pack is to be placed by a hydrocarbon or water carrying fluid. That is, the particles are suspended in the carrier fluid which can be viscosified and the carrier fluid is pumped into the subterranean producing zone in which a gravel pack is to be placed. Once the particles are placed in the zone, the treating fluid leaks off into the subterranean zone and/or is returned to the surface. The gravel pack produced functions as a filter to separate formation solids from produced fluids while permitting the produced fluids to flow into and through the well bore.

An example of a production stimulation treatment utilizing a treating fluid having particles suspended therein is hydraulic fracturing. That is, a treating fluid, referred to in the art as a fracturing fluid, is pumped through a well bore into a subterranean zone to be stimulated at a rate and pressure such that fractures are formed and extended into the subterranean zone. At least a portion of the fracturing fluid carries particles, referred to in the art as proppant particles into the formed fractures. The particles are deposited in the fractures and the fracturing fluid leaks off into the subterranean zone and/or is returned to the surface. The particles function to prevent the formed fractures from closing whereby conductive channels are formed through which produced fluids can flow to the well bore.

As more oil and gas wells are being drilled in deep water into high temperature deep zones, gravel packing in long open horizontal well bores is becoming more prevalent. The completion of the wells requires light weight high strength particles that are high temperature and chemical resistant. In order to prevent damage to the producing zone in which a gravel pack is placed, the treating fluid carrying the particles is generally viscosified to a relatively low degree. As a result, the particles suspended in the treating fluid must be of light weight, i.e., the particles must have a specific gravity in the range of from about 0.7 to about 2.2.

The use of lightweight particles lowers the overall density of the fluid carrying the particles which directly reduces the hydrostatic pressure applied to the well bore and helps prevent unwanted fracturing of the well bore. In addition, the use of lightweight particles reduces the concentration of gelling agent required to viscosify the carrier fluid, thus minimizing the amount of gelling agent residue that remains within the packed bed of particles or which penetrates into the subterranean producing zone.

The same is true of fracture stimulation treatments carried out in deep, high temperature wells, i.e., light weight high strength spherical particles having specific gravities in the range of from about 0.7 to about 2.2 are required due to the use of lower viscosity fracturing fluids and the high temperature of the subterranean zones being fractured.

A variety of light weight particles formed of thermoplastic materials including polyolefins, polystyrene divinylbenzene, polyfluorocarbons, polyethers etherketones and polyamide imides are commercially available. However, when the thermoplastic particles are exposed to temperatures above about 150° F., the particles soften and deform. As a result, the thermoplastic polymers are generally limited to gravel packing wells having low temperatures and they are generally not applicable in hydraulic fracturing operations.

Thus, there are needs for improved light weight high strength particles for use in gravel packing and fracturing procedures that have high temperature and chemical resistance and have specific gravities in the range of from about 0.7 to about 2.2.

SUMMARY OF THE INVENTION

The present invention provides light weight high strength particles and methods of using the particles in gravel packing, fracturing and similar operations which meet the needs described above and overcome the deficiencies of the prior art. The light weight high strength particles are basically comprised of sintered mixtures of a base material and hollow microspheres and they have high temperature and chemical resistance as well as specific gravities in the range of from about 0.7 to about 2.2.

A method of the present invention for treating a subterranean producing zone penetrated by a well bore is comprised of the following steps. A treating fluid that comprises a hydrocarbon or water carrier fluid having light weight high strength particles comprising sintered mixtures of a base material and hollow microspheres suspended therein is prepared or provided. Thereafter, the treating fluid is pumped into the subterranean producing zone and the particles are deposited therein.

Other and further objects, features and advantages of the present invention will be readily apparent to those skilled in the art upon a reading of the description of preferred embodiments which follows.

DESCRIPTION OF PREFERRED EMBODIMENTS

The light weight high strength particles of this invention which are useful in completing and stimulating wells are basically comprised of sintered mixtures of a base material and hollow microspheres. Because of the presence of the hollow microspheres mixed with the base material, the sintered particles formed from the mixture have low specific gravities in the range of from about 0.7 to about 2.2. Further, the light weight particles have high strength as well as high temperature and chemical resistance.

The base material can be formed of clay (hydrated aluminum silicate), bauxite (alumina bearing minerals containing 30–75% $Al_2O_2$, 9–31% $H_2O$, 3–25% $FeO_3$, 2–9% $SiO_2$ and 1–3% $TiO_2$), alumina ($AlO_2$), silica ($SiO_2$) and mixtures thereof. Preferred base materials are comprised of bauxite and clay, alumina and clay or alumina and silica. Of these, a mixture of bauxite and clay is most preferred.

While a variety of known methods of producing the particles of this invention including spraying, prilling, pelletizing and other similar procedures can be utilized, a suitable procedure is as follows. A powdered mixture of the base material, e.g., a mixture of bauxite and clay containing bauxite in an amount of about 60 weight % and clay in an amount of about 40 weight % is slurried in water. A suitable binder such as polyvinylacetate, methylcellulose and polymethylmethacrylate, preferably polymethylmethacrylate, is added to the slurry and hollow microspheres are added to the slurry. The mixture of base material and hollow microspheres in the slurry is comprised of base material in an amount in the range of from about 50% to about 90% by weight of the mixture and hollow microspheres in an amount in the range of from about 10% to about 50% by weight of the mixture.

Prior to adding the hollow microspheres to the slurry, the surfaces of the hollow microspheres can optionally be pretreated with a mixture of epoxy and amine organosilane coupling agents. The organosilane coupling agents greatly improve the wetability of the hollow microspheres whereby they can readily be mixed with the base material. In addition, the organosilane coupling agents attach to the surfaces of the hollow microspheres and form silanol thereon. The silanol undergoes immediate dehydration resulting in silicon-oxygen-silicon bonds (—Si—O—Si—) between the base material utilized and the hollow microspheres thereby enhancing the compressive, tensile, and bond strengths of the solid particles formed.

The organosilane coupling agents utilized are preferably mixtures of epoxy and amine organosilane coupling agents. Examples of such mixtures include 3-glycidoxypropyltrimethoxy silane and 3-aminopropyltriethoxy silane or 3-glycidoxypropyltrimethoxy silane and N-2-(aminoethyl)-3-aminopropyltrimethoxy silane. Most preferably, the organosilane coupling agent mixture used to surface treat the hollow microspheres is a 1:1 by weight mixture of 3-glycidoxypropyltrimethoxy silane and 3-aminopropyltriethoxy silane.

The surface pretreatment of the hollow microspheres is carried out by combining the mixture of organosilanes utilized with ethyl acetate while stirring the ethyl acetate. Thereafter, the hollow microspheres are added to the mixture and the resulting mixture containing the microspheres is heated at 170° F. for about one hour with continuous stirring, followed by filtration and drying. After drying, the surface treated hollow microspheres are heated to 150° F. in a vacuum oven for 24 hours. Under these conditions, the amino group of the amino organosilane reacts with the epoxy group of the epoxy organosilane on the surfaces of the hollow microspheres.

As will be understood by those skilled in the art, the particular amount and size of the hollow microspheres included in the base material-hollow microspheres mixture depends on the base material used and the amount and size of hollow microspheres required to achieve a specific gravity in the range of from about 0.7 to about 2.2. This amount can be determined by calculation and/or trial and error.

After the hollow microspheres have been added to the slurry containing the mixture of bauxite and clay and a binder, a major portion of the water in the slurry is removed and the resulting partially dried mixture of base material, binder and hollow microspheres is dried. Particles of the desired size are continuously recovered and then sintered by heating at a temperature of between about 1100° C. and 1750° C. The particles produced are in sizes in the range of from about 100 microns to about 2000 microns and the hollow microspheres in the particles are of a size in the range of from about 5 microns to about 65 microns.

As will now be understood, the quantity and size of the hollow microspheres utilized in the mixture of base material and hollow microspheres control the specific gravity of the particles formed. Depending on the particular density of the base material utilized, microspheres of the same size or of varying sizes are mixed with the base material to produce light weight high strength particles having specific gravities in the range of from about 0.7 to about 2.2.

A variety of hollow microspheres can be utilized in accordance with this invention including, but not limited to, hollow mineral glass spheres that are commercially available under the tradename "SPHERELITES™" from Halliburton Energy Services of Duncan, Okla.; hollow cenospheres formed of silica and aluminia filled with low pressure gases commercially available under the trade designation "CENOLIGHT®" from Microspheres, S.A.; hollow microspheres that are formed of glass and are commercially available under the trade designation "SCOTCHLIGHT™", from the 3M Company of St. Paul, Minn.; and microspheres formed of ceramic material that are commercially available under the trade designation "Z-LIGHT SPHERES™" from the 3M Company of St. Paul, Minn. The crush strengths, true densities and particle sizes of the "SCOTCHLIGHT™", and "Z-LIGHT SPHERES™" hollow microspheres are set forth in the Table below.

TABLE

Hollow Microsphere Properties

| Hollow Microspheres | Compressive Strength, psi | True Density g/cc | Particle Size, microns |
|---|---|---|---|
| "SCOTCHLIGHT ™" Glass Bubble General Purpose Series[1] | | | |
| K32 | 2,000 | 0.32 | 20 |
| K37 | 3,000 | 0.37 | 20 |
| S38 | 4,000 | 0.38 | 15 |
| K46 | 6,000 | 0.46 | 15 |
| S60 | 10,000 | 0.60 | 10 |
| "SCOTCHLIGHT ™" Glass Bubble Floated Purpose Series[1] | | | |
| H20 | 1,000 | 0.20 | 30 |
| D30 | 4,500 | 0.20 | 20 |
| H50 | 10,000 | 0.20 | 20 |
| "Z-LIGHT SPHERES ™" Ceramic Microspheres[2] | | | |
| G-3125 | 2,000 | 0.7 | 50 |
| G-3150 | 2,000 | 0.7 | 55 |
| G-3500 | 2,000 | 0.7 | 65 |

[1]Commercially available from 3M Company of St. Paul, MN.
[2]Commercially available from 3M Company of St. Paul, MN.

The methods of the present invention for treating a subterranean producing zone penetrated by a well bore are basically comprised of the following steps. A treating fluid that comprises a hydrocarbon or water carrier fluid having light weight high strength spherical solid particles comprising sintered mixtures of a base material and hollow microspheres suspended therein is prepared or provided. Thereafter, the treating fluid is pumped into the subterranean producing zone and the particles are deposited therein.

The treating fluid can be a fracturing fluid whereby the solid particles are deposited in fractures formed in the subterranean zone, a gravel packing fluid whereby the particles are deposited in the well bore adjacent to the subterranean producing zone, or other similar subterranean zone treating fluid.

A preferred method of the present invention for treating a subterranean producing zone penetrated by a well bore comprises the steps of: (a) preparing or providing a treating fluid that comprises a hydrocarbon or water carrier fluid having light weight high strength solid particles suspended therein, said particles comprising sintered mixtures of a base material and hollow microspheres; and (b) pumping the treating fluid into the subterranean producing zone whereby the solid particles are deposited therein.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. A method of treating a subterranean producing zone penetrated by a well bore comprising the steps of:
    (a) preparing or providing a treating fluid that comprises a hydrocarbon or water carrier fluid having light weight high strength particles suspended therein, said particles comprising sintered mixtures of a base material and hollow microspheres; and
    (b) pumping said treating fluid into said subterranean producing zone whereby said particles are deposited therein.

2. The method of claim 1 wherein said treating fluid is a fracturing fluid and said particles are deposited in fractures formed in said subterranean producing zone.

3. The method of claim 1 wherein said treating fluid is a gravel packing fluid and said particles are deposited in said well bore adjacent to said subterranean producing zone.

4. The method of claim 1 wherein said particles have specific gravities in the range of from about 0.7 to about 2.2.

5. The method of claim 1 wherein said base material is selected from the group consisting of clay, bauxite, alumina, silica and mixtures thereof.

6. The method of claim 1 wherein said sintered base material has a crush strength in the range of from about 1000 psi to about 10,000 psi.

7. The method of claim 1 wherein said hollow microspheres are formed of glass.

8. The method of claim 1 wherein said hollow microspheres are formed of a ceramic material.

9. The method of claim 1 wherein said hollow microspheres have a crush strength in the range of from about 1000 psi to about 10,000 psi.

10. The method of claim 1 wherein said particles are of a size in the range of from about 100 microns to about 2000 microns.

11. The method of claim 1 wherein said hollow microspheres are of a size in the range of from about 5 microns to about 65 microns.

12. The method of claim 1 wherein said particles further comprise a binder.

13. The method of claim 12 wherein said binder is selected from the group consisting of polyvinylacetate, methylcellulose and polymethylmethacrylate.

14. The method of claim 1 wherein said base material is present in said particles in an amount in the range of from about 50% to about 90% by weight of said particles.

15. The method of claim 1 wherein said hollow microspheres are present in said particles in an amount in the range of from about 10% to about 50% by weight of said particles.

* * * * *